Oct. 12, 1943.   H. BENNETT   2,331,298
PLOTTING DEVICE
Filed Dec. 20, 1941   3 Sheets-Sheet 2

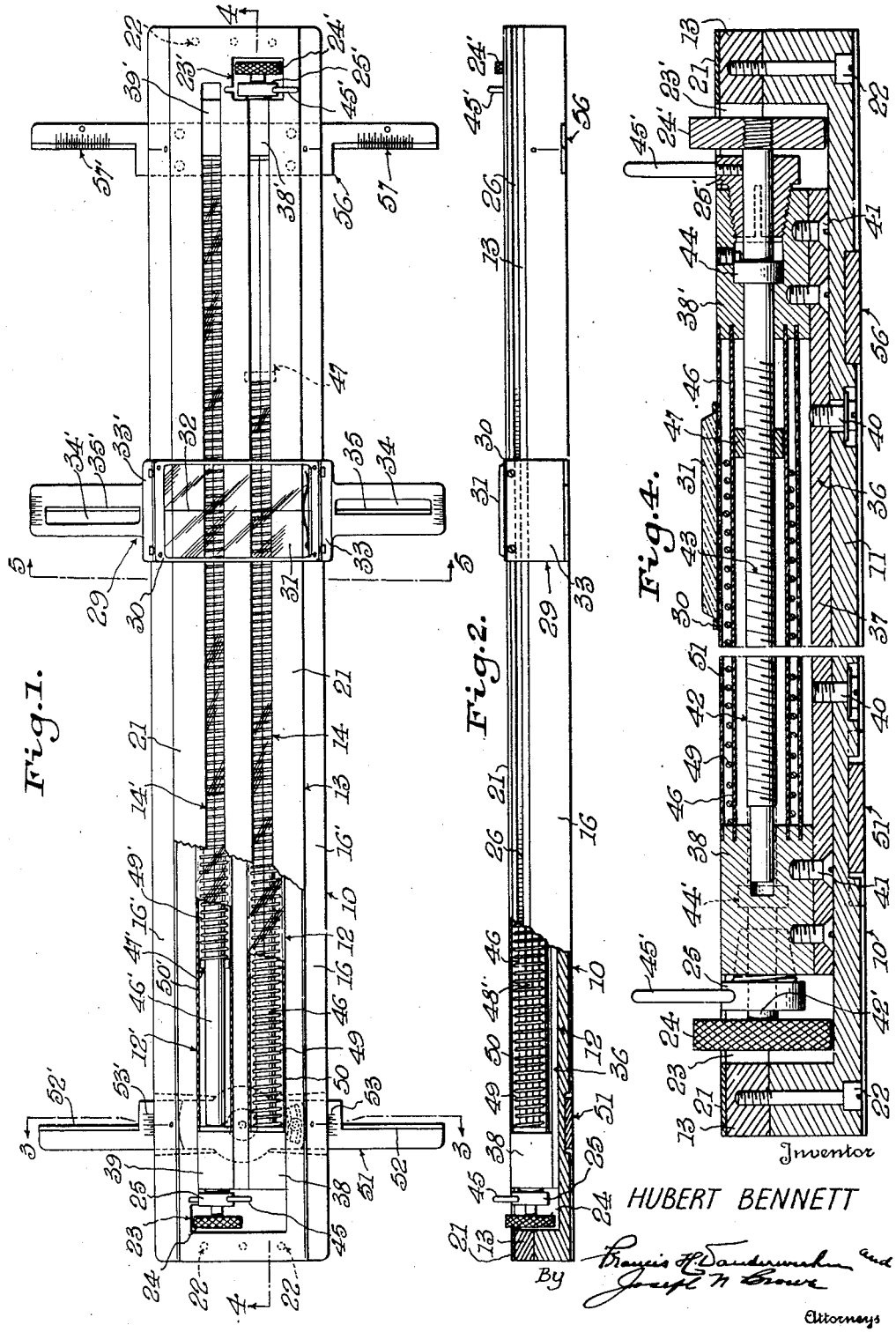

Inventor
HUBERT BENNETT
By
Attorneys

Oct. 12, 1943.   H. BENNETT   2,331,298
PLOTTING DEVICE
Filed Dec. 20, 1941   3 Sheets-Sheet 3

Inventor
HUBERT BENNETT

Attorneys

Patented Oct. 12, 1943

2,331,298

UNITED STATES PATENT OFFICE 2,331,298

PLOTTING DEVICE

Hubert Bennett, United States Army

Application December 20, 1941, Serial No. 423,736

8 Claims. (Cl. 33—103)

(Granted under the act of March 3, 1883, as amended April 30, 1928; 370 O. G. 757)

The invention described herein may be manufactured and used by or for the Government for governmental purposes, without the payment to me of any royalty thereon.

This invention relates generally to measuring instruments, but more particularly to a plotting device provided with scales, the lineal graduations of which may be changed to represent equal or proportional divisions of any suitable length within the limits of the distance measured.

One object of the invention is to provide an instrument for converting one scale of measurements to another.

Another object of the invention is to provide a proportional dividing instrument of simple, inexpensive, and durable construction, particularly adapted for measuring and transposing the measurements of maps or other drawings at a like or proportional scale.

Still another object of the invention is to provide a plotting device which may be used on any type of projection medium and at any desired projection scale.

Other objects and advantages will be apparent from the following description, and it will be understood that changes in the specific structure shown and described may be made within the scope of the claims without departing from the spirit of the invention.

Referring more particularly to the accompanying drawings in which corresponding parts are indicated by similar reference characters:

Fig. 1 is a top plan view of the instrument partially sectionized at one end to show the spring assembly;

Fig. 2 is a front elevation of the instrument partially sectionized at one end to show a side view of the spring assembly;

Fig. 4 is a partially sectionized view taken on the line 4—4 of Fig. 1;

Figure 3:
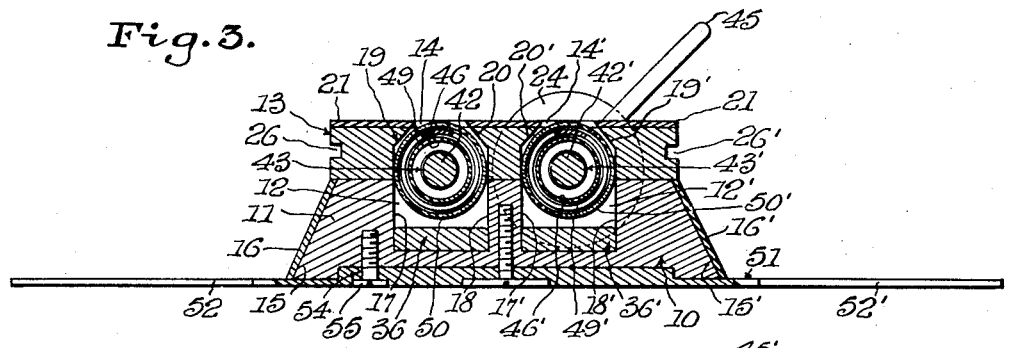
Fig. 3 is a sectionized view taken on the line 3—3 of Fig. 2, in the direction of the arrows.
Figure 5:
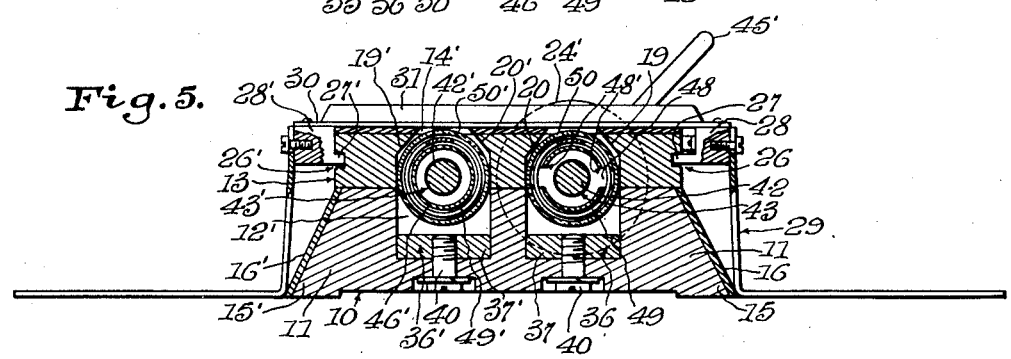
Fig. 5 is a sectionized view taken on the line 5—5 of Fig. 1.
Figure 8:
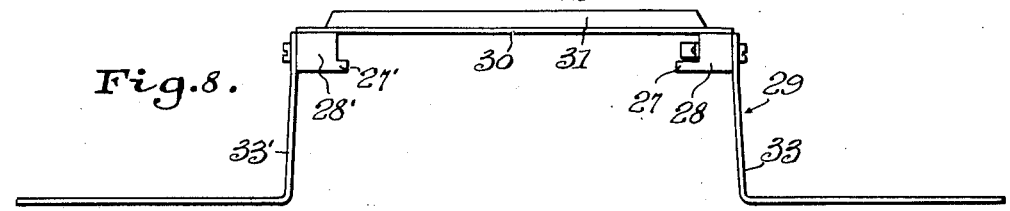
Fig. 8 is a side elevation of the sliding indicator.
Figure 6:
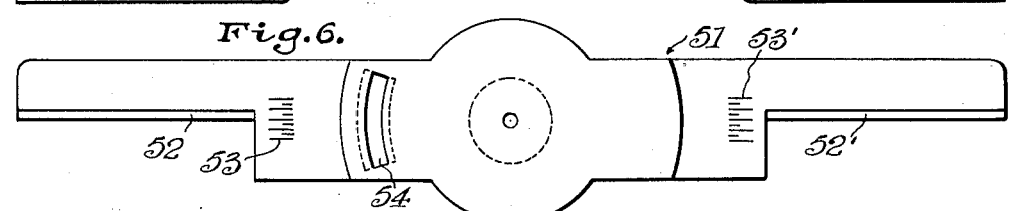
Fig. 6 is a top plan view of the convergence indicator.
Figure 7:
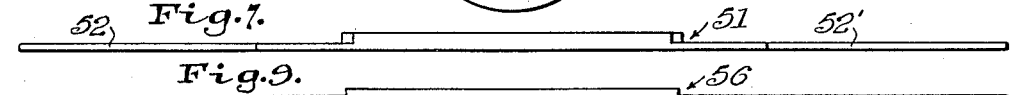
Fig. 7 is a side elevation of the convergence indicator.
Figure 9:
Fig. 9 is a side elevation of the curvature indicator.
Figure 10:
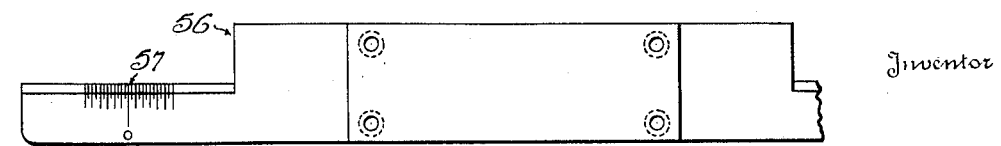
Fig. 10 is a top plan view of the curvature indicator.
Figure 11:
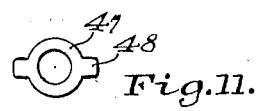
Fig. 11 is an end view of the traveling nut.

Briefly stated the plotting device comprises a ruler provided with two longitudinally arranged springs, the coils of which indicate graduations and which may be extended to any suitable distance for proportionately dividing a length measured.

The plotting instrument is so designed that plotting is made possible through its use on any type of projection medium and at any desired projection scale. This is effected by means of adjusting screws which cause the graduated springs to extend or contract as desired to suit the projection in use.

It will be noted that with this instrument suitable scales may be formed to suit particular measurements, as in the case where it is necessary to change the scale due to convergence of the meridian as at the poles, where it would be advantageous to increase the scale of measurement, or at the equator where a smaller scale is more suitable due to increase in distance between the meridians. The plotting device herein described is adjustable, making it adaptable to any projection scale at any desired latitude from the equator to the poles.

Referring to the figures in which like parts are indicated by similar reference characters, the numeral 10, Figs. 1 to 5 inclusive, indicates a rule member comprising an elongated base 11 provided with longitudinal parallel channels 12 and 12' and a strip or top member 13 which is mounted upon said base and which is provided with longitudinal slots 14 and 14' parallel to the channels in said base.

The base 11 is formed with sloping exterior side walls 15 and 15' which are faced with Celluloid strips 16 and 16'. The channels 12 and 12' within said base 11 have perpendicular side walls 17, 18 and 17', 18' which are continued upward into the strip or top member 13 until they are intercepted by sloping lateral surfaces 19, 20 and 19', 20' which diverge from the slotted openings 14 and 14' in the upper surface thereof which is provided with a Celluloid facing 21.

The slotted strip or top member 13 is rigidly attached to the lower member or base 11 by means of the screws 22, and the channels 12 and 12' formed within the rule 10 each terminate at one end thereof in square openings 23 and 23' in which are mounted hand knobs 24 and 24' and locking chucks 25 and 25' as will be further explained.

The sides of the top member 13 are each provided with a longitudinal groove 26 and 26' to accommodate inwardly directed tongues 27 and 27' on the lateral frame supports 28 and 28' of the runner or indicator 29 which is thus slidably mounted to said top member 13. The frame 30 to which the lateral supports 28 and 28' of the sliding indicator 29 are attached is fitted with a glass 31 on which is engraved a hair line 32. To the lateral frame supports 28 and 28' are attached indicating arms 33 and 33' which project downwardly and outwardly from the frame supports and are provided with slots 34 and 34' having straight edges 35 and 35' in alignment with the hair line 32.

Within the channels 12 and 12' are mounted shaft supporting members 36 and 36'. The shaft supporting members are each composed of an elongated base plate 37 and 37' having a bearing at each end which are indicated respectively by the numerals 38, 38' and 39, 39', as shown in Figs. 1 to 5 inclusive. The elongated base plates 37 and 37' are attached to the base 11 by screws 40, and the bearing members 38, 38' and 39, 39' are attached to elongated supporting members 36 and 36' by the screws 41.

Within the bearing members 38, 38' and 39, 39' are mounted respectively the shafts 42 and 42'. These shafts are each provided with a central threaded portion 43 and 43' forming elongated screws between bearing surfaces which fit drilled openings in the bearing members 38, 38' and 39, 39'. The bearing members 38' and 39 are drilled with a central opening having a larger and a smaller diameter. The portion of smaller diameter forms a bearing surface for the shaft and the portion of larger diameter is adapted to fit collars 44 and 44' on the shafts. Beyond the collars the openings are tapered and tapped to receive split chuck members 25 and 25' which are adapted to lock the shafts in order to prevent either rotation or longitudinal movement thereof within the bearings. The chucks are provided with handles 45 and 45' for turning the same within the tapped openings and the shafts are provided with turning knobs 24 and 24' for rotating the same within the bearings.

The shaft members 42 and 42' are encircled by metallic tubes 46 and 46' which are slotted on opposite sides, and the shafts are each provided with a traveling nut 47 and 47' having laterally projecting ears 48 which project through the slots 48', in the tubes 46 and 46'.

Helical springs 49 and 49' encircle the tubes 46 and 46' and abut the bearings 38 and 39' and the ears of the traveling nuts 47 and 47', and glass tubes 50 and 50' surround the springs 49 and 49'. The coils of the springs are colored to designate graduations, as will further be explained.

To the lower surface of the base and adjacent one end thereof is pivotally mounted a convergence indicator 51, which comprises an elongated member provided with aligned straight edges 52 and 52' at either side thereof, and marked with angular graduations 53 and 53' on the upper surface thereof, adjacent the straight edge of the base 11, the latter being marked with zero lines.

The convergence indicator is also provided with an arcuate slot 54 through which passes a set screw 55 for setting the indicator at any desired angle with respect to the rule 10.

At the other end of the base is attached a curvature indicator 56 which is rigidly fastened to the lower surface of the base 11, and which is provided on either side thereof by scale members 57 and 57' projecting from the base at right angles thereto.

The helical springs 49 and 49' provide the instrument with scales of variable graduation, the coils of said springs functioning to indicate the graduations of said scales. To more easily identify the units of graduation the coils of the springs are colored in the following manner, every twentieth coil may be colored white, every tenth coil (between the white coils) may be colored red, and every second coil (between the red and white coils) may be colored blue, or any other arrangement of colors may be used which will be most suitable for identifying the graduations.

Figure 12:
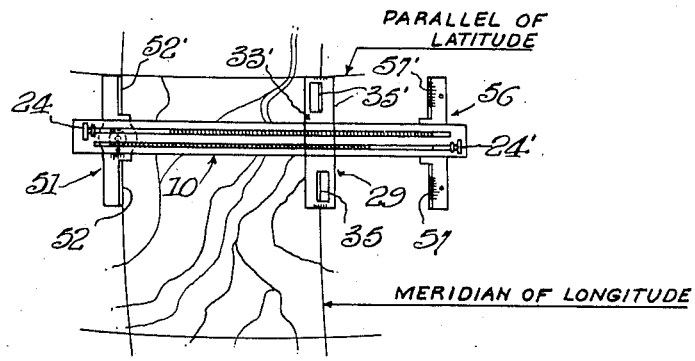
Fig. 12 is a diagrammatic view showing the application of the device when obtaining a longitude measurement.

The operation of the device for obtaining measurements of both longitude and latitude is as follows:

To adjust the instrument to the desired projection scale for obtaining measurements of longitude, set the convergence indicator 51, Figs. 1 and 12, at zero; place the instrument on the projection medium with its longitudinal edge parallel to one of the parallels of latitude and with the end of the straight edge 52' of the convergence indicator 51 touching the parallel of latitude and splitting the center of the nearest meridian of longitude.

Holding the instrument in this position move the sliding indicator or runner 29 along the parallel of latitude until the straight edges 35 and 35' thereof split the center of the next meridian of longitude with the outer end or lateral edge of the runner arm 33' touching the parallel of latitude as shown in Fig. 12. At this point, if the convergence of the meridian of longitude, upon which the convergence indicator is set, is great enough to be noticeable turn the convergence indicator 51 until the straight edges 52 and 52' thereof split the center of the meridian and recheck the sliding indicator 29 to see that it is still set correctly.

Without moving the instrument turn the scale adjuster 24', Figs. 1 and 12, in the desired direction until the zero mark of the graduated spring moves to a point directly under the hair line 32 of the sliding indicator, and lock in this position by turning the locking lever 45', Figs. 1 and 4. Now remove the instrument from the projection and tighten the locking screw 55 of the convergence indicator 51, the instrument is now adjusted for the desired plotting scale of longitude.

To complete the measurements it is now necessary to adjust the latitude side of the instrument to the working scale of the projection medium in use. This is done in a similar manner as above.

Figure 13:
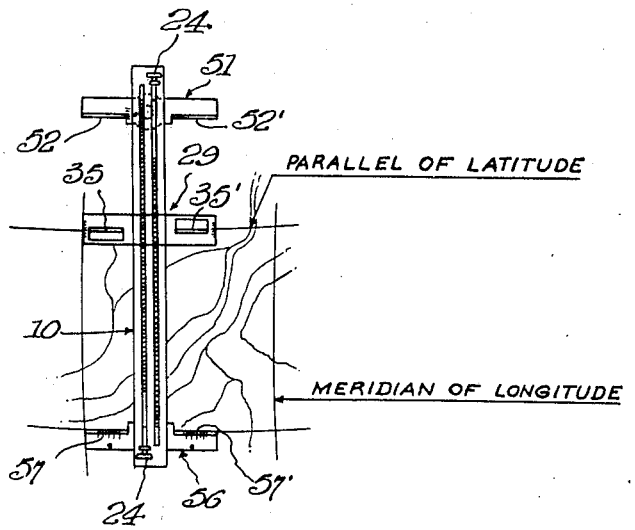
Fig. 13 is a diagrammatic view showing the application of the device when obtaining a latitude measurement.

Beginning with the opposite end of the instrument set the straight edges 57 and 57' of the curvature indicator 56, Figs. 1 and 13, on and splitting the parallel of latitude along which the longitude adjustment was made with the end of the straight edge 57 touching the nearest meridian of longitude, as shown in Fig. 13.

At this point note whether or not the center of the parallel of latitude follows along the straight edge on both sides of the curvature indicator 56, or whether it curves off of the straight edge. If the latter is true, the scale should be shifted until an even number of graduations is bisected on each side of the curvature indicator, this assures the perpendicular setting of the instrument.

Now move the sliding indicator 29 up along the rule portion of the instrument until it is splitting the next adjacent parallel of latitude, and without moving the instrument, turn the scale adjuster 24 in the desired direction until the zero mark of the graduated spring moves to a point directly under the hairline 32 of the sliding indicator, and lock in this position by turning the locking lever 45, Fig. 1. The instrument is now adjusted to the desired plotting scale for latitude.

The sliding indicator 29 has been provided with straight edges to assist the plotter in locating the intersection of the plotted points, by using a little judgment as to approximately where the point will fall, and then placing the instrument with the proper setting on the projection near the approximate location of the point and drawing a line the full length of the straight edge for both latitude and longitude. It will be seen that the intersection of the two lines give the position of the point being plotted without the use of triangles to intersect the two points as is done in the method of plotting using the flat boxwood scales.

Having described my invention, what I claim as new and wish to secure by Letters Patent is:

1. A plotting device comprising, an elongated rule member having longitudinal channels therein; support members, provided with shaft bearings at either end thereof mounted within said channels, threaded shafts rotatably mounted within said bearings, tubes provided with longitudinal slots, surrounding said shafts and supported by said bearing members, helical springs surrounding said tubes and provided with colored coils to indicate graduations, means cooperating with said shafts and said tubes adapted to limit the extent of said springs dependent on the rotation of said shaft, turning knobs attached to each of said shafts adapted to rotate the same, whereby the extent of said spring may be limited to a given measurement, and means comprising a locking chuck adapted to retain the extension of the spring to a given length.

2. A plotting device including an elongated rule member having longitudinal parallel channels formed therein, scale members comprising helical springs mounted within said channels, the coils of said springs being colored to indicate graduations, means including screw threaded rotatable shafts and traveling nuts threadably engaging said shafts adapted to vary the extension of said springs whereby lineal distances between predetermined graduations on said springs may be divided into a selected number of equal lengths.

3. A plotting device including an elongated rule member having longitudinal parallel channels formed therein, rotatable threaded shafts mounted within said channels, tubes provided with longitudinal slots surrounding said shafts, springs having colored coils representing graduations, surrounding said tubes, traveling nuts mounted on said shafts and provided with tongues adapted to project through the slots in said tubes and engage the ends of said springs to vary the extent of said springs with the rotation of said shafts.

4. A plotting device including an elongated rule member having longitudinal parallel channels formed therein, rotatable threaded shafts mounted within bearing members in said channels, a tube having a slot on either side thereof surrounding each of said shafts, a traveling nut provided with tongues on either side thereof threadably engaging each of said shafts, with the tongues projecting through the slots in said tubes, helical springs provided with colored coils to designate graduations, surrounding each of said slotted tubes and abutting the shaft bearings and the tongues of said traveling nuts, whereby rotation of the shaft limits the extent of said springs and the length of the graduations represented thereon.

5. A plotting device comprising an elongated rule member provided with longitudinal channels, scale members comprising helical springs mounted to extend within said channels, said springs having colored coils adapted to represent graduations, means including a convergence indicator, a sliding indicator and a curvature indicator mounted upon said rule, and means adapted to vary the length of said graduated springs to divide a distance measured thereby into a predetermined number of equal and proportional parts.

6. A plotting device comprising, an elongated rule member having longitudinal channels therein, support members provided with shaft bearings at either end thereof, mounted within said channels, threaded shafts rotatably mounted within said bearings, tubes provided with longitudinal slots, surrounding said shafts and supported by said bearing members, a traveling nut threadably engaging each of said shafts and provided with ears which project through the slots in said tubes, helical springs surrounding said tubes and extending between a bearing and the ears of a traveling nut, and provided with colored coils to indicate graduations, transparent tubes surrounding said springs, turning knobs attached to each of said shafts adapted to rotate the same to effect longitudinal movement of said traveling nuts whereby the extent of each of said springs may be limited to a given measurement, and means comprising a locking chuck adapted to retain the extension of the spring to a given length.

7. A plotting device comprising, an elongated rule member having longitudinal channels therein, support members provided with shaft bearings at either end thereof, mounted within said channels, threaded shafts rotatably mounted within said bearings, tubes provided with longitudinal slots, surrounding said shafts and supported by said bearing members, a traveling nut threadably engaging each of said shafts and provided with ears which project through the slots in said tubes, helical springs surrounding said tubes and extending between a bearing and the ears of a traveling nut, and provided with colored coils to indicate graduations, transparent tubes surrounding said springs, turning knobs attached to each of said shafts adapted to rotate the same to effect longitudinal movement of said traveling nuts whereby the extent of each of said springs may be limited to a given measurement, and means including a convergence indicator, a sliding indicator and a curvature indicator mounted upon said rule adapted to define the lineal distance to which the springs are extended in procuring desired measurements.

8. A plotting device comprising an elongated rule member provided with longitudinally extending parallel channels, shafts rotatably mounted within said channels, means attached to one extremity of each shaft for effecting its rotation, graduated helical springs within said channels and surrounding the shafts therein, and means in connection with each of said shafts for engagement with one extremity of its surrounding spring, the respective means being adjustable lengthwise of the shafts upon their rotation to vary the length of said graduated springs for dividing a distance measured thereby into a predetermined number of equal parts.

HUBERT BENNETT.